US012425242B1

(12) United States Patent
Stapleton

(10) Patent No.: US 12,425,242 B1
(45) Date of Patent: Sep. 23, 2025

(54) TIME STAMP TOKEN (TST) BLOCKCHAINS

(71) Applicant: Wells Fargo Bank, N.A., San Francisco, CA (US)

(72) Inventor: Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 340 days.

(21) Appl. No.: 18/100,816

(22) Filed: Jan. 24, 2023

(51) Int. Cl.
*H04L 29/06* (2006.01)
*H04L 9/00* (2022.01)
*H04L 9/32* (2006.01)

(52) U.S. Cl.
CPC .............. *H04L 9/50* (2022.05); *H04L 9/321* (2013.01); *H04L 9/3236* (2013.01)

(58) Field of Classification Search
CPC .......... H04L 9/50; H04L 9/321; H04L 9/3236
See application file for complete search history.

(56) References Cited

U.S. PATENT DOCUMENTS

| 10,305,833 | B1* | 5/2019 | Dennis | ...................... | H04L 9/16 |
| 10,404,471 | B1* | 9/2019 | Griffin | ................... | H04L 63/123 |
| 11,574,305 | B1* | 2/2023 | Griffin | ................... | G06Q 20/02 |
| 2021/0377002 | A1* | 12/2021 | Guillama | ................ | G06F 21/64 |
| 2022/0417030 | A1* | 12/2022 | Shrivastava | .......... | H04L 9/3247 |
| 2023/0328040 | A1* | 10/2023 | O'Brien | ............. | H04L 63/0421 |
| | | | | | 726/1 |

FOREIGN PATENT DOCUMENTS

| CN | 101711395 A | * | 5/2010 | ........... | G06Q 20/045 |
| CN | 103385006 A | * | 11/2013 | ........... | H04N 21/237 |
| CN | 108833081 A | * | 11/2018 | ........... | H04L 9/0643 |

* cited by examiner

*Primary Examiner* — Shawnchoy Rahman
(74) *Attorney, Agent, or Firm* — Foley & Lardner LLP

(57) ABSTRACT

The present disclosure is directed to systems, methods, and non-transitory computer-readable media including receiving, by a Time Stamp Authority (TSA) computing system from a requestor computing system, hashed data corresponding to original data, generating, by the TSA, a Time Stamp Token (TST) for the hashed data, publishing, by the TSA, the TST to a blockchain, and sending, by the TSA to the requestor computing system, the TST.

17 Claims, 4 Drawing Sheets

TIME STAMP TOKEN (TST) BLOCKCHAINS

BACKGROUND

In a conventional Time Stamp Token (TST) scheme, a requestor sends hashed data to a Time Stamp Authority (TSA), receives the TST from the TSA, and shares the original data and TST to a relying party for verification. In a conventional blockchain scheme, a requestor sends data (e.g., a transaction) to a blockchain provider, the provider posts a new block to the blockchain with data from multiple requestors, and relying parties read the blockchain to obtain the information.

SUMMARY

In some arrangements, systems, methods, non-transitory computer readable media, and apparatuses are directed to receiving, by a Time Stamp Authority (TSA) computing system from a requestor computing system, hashed data corresponding to original data, generating, by the TSA, a Time Stamp Token (TST) for the hashed data, publishing, by the TSA, the TST to a blockchain, and sending, by the TSA to the requestor computing system, the TST.

In some arrangements, systems, methods, non-transitory computer readable media, and apparatuses are directed to sending, by a requestor device to a TSA computing system, hashed data corresponding to original data, wherein the TSA computing system publishes a TST for the hashed data to a blockchain, and granting, by the requestor computing system to a relying party computing system, permission to access the original data, wherein the relying party computing system retrieves the original data and the TST and verifies TST.

In some arrangements, systems, methods, non-transitory computer readable media, and apparatuses are directed to receiving, by a relying party computing system from a requestor computing system, permission to access original data, retrieving, by the relying party computing system the original data and a TST generated by a TSA for hashed data corresponding to the original data, the TST published to a blockchain, verifying, by the relying party computing system, the TST.

These and other features, together with the organization and manner of operation thereof, will become apparent from the following detailed description when taken in conjunction with the accompanying drawings.

DETAILED DESCRIPTION

Referring generally to the FIGS., apparatuses, systems, methods, and non-transitory computer-readable media described herein relate to a centralized TST blockchain repository managed by the TSA. In some arrangements, blockchain-based TSA operations provide permissioned or permissionless data integrity provable to a trusted time indicated by the TST. A permissioned blockchain as described herein can support data such as private files or documents, legal contracts, and distributed software. A permissionless blockchain as described herein can support publicly available information. In some arrangements, a TST includes a data hash and a signed-data, thus enabling permissioned or permissionless non-repudiation. A permissioned blockchain with non-repudiation as described herein can support data such as private files or documents, legal contracts, and distributed software. A permissionless blockchain as described herein can support data such as corporate annual reports or other types of documents. In some arrangements, blockchains for a TSA are reused to publish its TST either publicly or privately, such that requestors can manage document integrity with relying parties. In some arrangements, requestors and relying parties use multiple TSA services, each TSA managing its own blockchain. In some arrangements, multiple TSAs using a common blockchain service for various industries (e.g., financial services, notary services, audit services, software distribution) and/or for various purposes.

Figure 1:
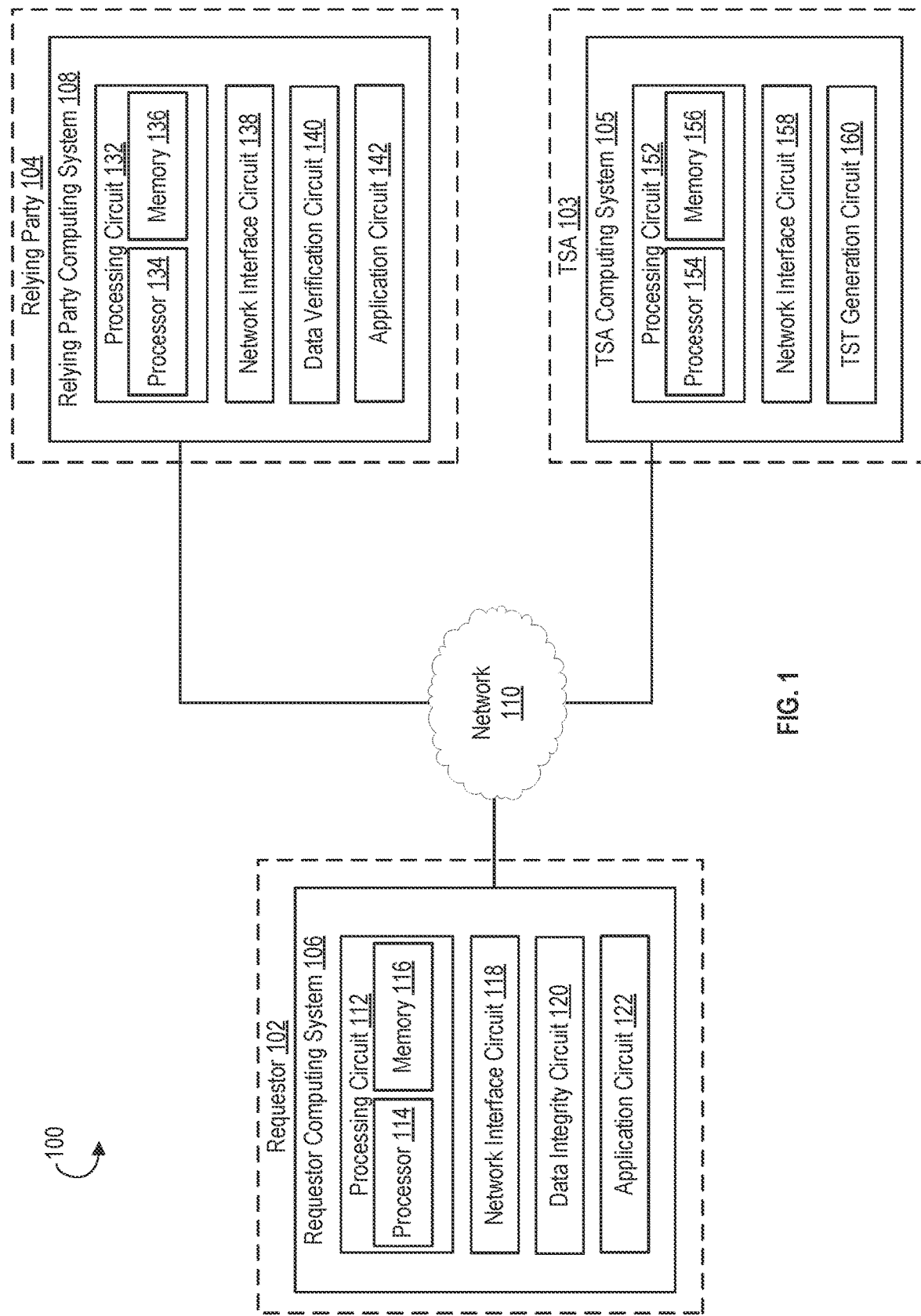
FIG. 1 is a block diagram of a system configured to implement a Time Stamp Token (TST) blockchain, according to some arrangements.

FIG. 1 is a block diagram of a system 100 configured to implement a TST blockchain, according to some arrangements. The system 100 includes at least a requestor computing system 106, a relying party computing system 108, and a TSA computing system 105. The system 100 facilitates blockchain-based TST generation and data integrity verification between various parties, including a requestor 102, a relying party 104, and a TSA 103. The requestor 102 and the relying party 104 are entities (e.g., individuals, companies, organizations, systems, servers, devices, software, applications, entities, accounts, etc.) desiring to securely share, transfer, or data with each other. For example, the relying party 104 can be a party requesting data (referred to as original data) from the requestor 102, and verification (e.g., via the TST blockchain) of the data. The requestor 102 is associated with, operates, or performs computing functions through the requestor computing system 106. The relying party 104 is associated with, operates, or performs computing functions through the relying party computing system 108. The TSA 103 is associated with, operates, or performs computing functions through the TSA computing system 105.

Each of the TSA computing system 105, the requestor computing system 106, and the relying party computing system 108 is a computing system having processing, storage, and networking capabilities. In some arrangements, the TSA computing system 105, the requestor computing system 106, and the relying party computing system 108 can be Internet-connected or network-connected computing devices e.g., computers, servers, mobile devices, datacenters, smartphones, smart wearables, etc. Each of the TSA computing system 105, the requestor computing system 106, and the relying party computing system 108 can include any type of device or system configured to execute one or more software applications. Each of the TSA computing system 105, the requestor computing system 106, and the relying party computing system 108 include an operating system (e.g., Windows, Linux, MAC OS, etc.) on which the software applications can be executed.

The requestor computing system 106, the relying party computing system 108, and the TSA computing system 105 can transfer communications, data, information, messages, certificates, and so on, using the network 110. The network 110 is any suitable Local Area Network (LAN), Wide Area Network (WAN), or a combination thereof. For example, the network 110 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. The network 110 is structured to permit the exchange of data, values, instructions, messages, and the like.

In some arrangements, the requestor computing system 106 includes a processing circuit 112 having a processor 114 and a memory 116. The processor 114 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 116 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 116 is or includes tangible, non-transient volatile memory or non-volatile memory. Accordingly, the memory 116 includes database components, object code components, script components, or any other type of information structure for supporting the various activities and information structures described herein. The processing circuit 112 can be used to implemented one or more of the circuits 118, 120, and 122.

The network interface circuit 118 is configured for and structured to establish a connection and communicate with the relying party computing system 108 and the TSA computing system 105 via the network 110. The network interface circuit 118 is structured for sending and receiving data over a communication network (e.g., the network 110). Accordingly, the network interface circuit 118 includes any of a cellular transceiver (for cellular standards), wireless network transceiver (for 802.11X, ZigBee, Bluetooth, Wi-Fi, or the like), wired network interface, or a combination thereof. For example, the network interface circuit 118 may include wireless or wired network modems, ports, baseband processors, and associated software and firmware.

The data integrity circuit 120 is structured to request a TST for original data (e.g., a unit of data) from the TSA computing system 105. For example, the data integrity circuit 120 can run the original data through a hash function to generated hashed data corresponding to the original data and configure the network interface circuit 118 to send a request for TST to the TSA computing system 105 via the network 110. The request includes a hashed data that is the hash of the original data. The data integrity circuit 120 is structured to permit the relying party 104 to access (e.g., receive, view, download, read, etc.) the original data and to verify the integrity of the original data. For example, the data integrity circuit 120 can configure the network interface circuit 118 to send a permission notification to the relying party computing system 108. The permission notification includes the original data, or a link or address of the original data. For example, the link or address of the original data includes a Uniform Resource Locator (URL) of a location where the original data is stored, a Uniform Resource Identifier (URI) of a location where the original data is stored, a Uniform Resource Name (URN) of a location where the original data is stored, and so on. The permission notification includes a link, address, or identifier of the TST on the blockchain. The link, address, or identifier of the TST includes a URL, a URI, a URN, or another suitable identifier that identifies the block on the blockchain that contains the TST associated with the original data.

The application circuit 122 can be used to execute one or more applications or software on the requestor computing system 106 for which data needs to be accessed by the relying party computing system 108. For example, the application circuit 122 can execute one or more applications that generate the original data to be accessed by the relying party computing system 108. For example, the application circuit 122 can execute a mobile banking application, a browser, a word processing application, a mobile banking application, a mobile wallet, and so on. The original data can be received by user input device (e.g., keyboard, touch-screen, microphone, mouse, etc.) coupled to the requestor computing system 106.

In some arrangements, the relying party computing system 108 includes a processing circuit 132 having a processor 134 and a memory 136. The processor 134 is implemented as a general-purpose processor, an ASIC, one or more FPGAs, a DSP, a group of processing components, or other suitable electronic processing components. The memory 136 (e.g., RAM, ROM, NVRAM, Flash Memory, hard disk storage, etc.) stores data and/or computer code for facilitating the various processes described herein. Moreover, the memory 136 is or includes tangible, non-transient volatile memory or non-volatile memory. Accordingly, the memory 136 includes database components, object code components, script components, or any other type of information structure for supporting the various activities and information structures described herein. The processing circuit 132 can be used to implemented one or more of the circuits 138, 140, and 142.

The network interface circuit 138 is configured for and structured to establish a connection and communicate with the requestor computing system 106 and the TSA computing system 105 via the network 110. The network interface circuit 138 is structured for sending and receiving data over a communication network (e.g., the network 110). Accordingly, the network interface circuit 138 includes any of a cellular transceiver (for cellular standards), wireless network transceiver (for 802.11X, ZigBee, Bluetooth, Wi-Fi, or the like), wired network interface, or a combination thereof. For example, the network interface circuit 138 may include wireless or wired network modems, ports, baseband processors, and associated software and firmware.

The data verification circuit 140 is structured to receive, via the network interface circuit 138, the permission notification to access the original data and verify the integrity of the original data by accessing the TST corresponding to the original data on a blockchain.

The application circuit 142 can be used to execute one or more applications or software on the relying party computing system 108 for which original data of the requestor 102 needs to be accessed. For example, the application circuit 142 can execute one or more applications that use verified original data of the requestor 102 as input to generate an output or a decision. For example, the application circuit 142 can execute a server application for a mobile banking platform, a browser, a word processing, a mobile banking platform, a mobile wallet platform, and so on.

In some arrangements, the TSA computing system 105 includes a processing circuit 152 having a processor 154 and a memory 156. The processor 154 is implemented as a general-purpose processor, an ASIC, one or more FPGAs, a DSP, a group of processing components, or other suitable electronic processing components. The memory 156 (e.g., RAM, ROM, NVRAM, Flash Memory, hard disk storage, etc.) stores data and/or computer code for facilitating the various processes described herein. Moreover, the memory 156 is or includes tangible, non-transient volatile memory or non-volatile memory. Accordingly, the memory 156 includes database components, object code components, script components, or any other type of information structure for supporting the various activities and information structures described herein. The processing circuit 152 can be used to implemented one or more of the circuits 158 and 160.

The network interface circuit 158 is configured for and structured to establish a connection and communicate with the requestor computing system 106 and the relying party computing system 108 via the network 110. The network interface circuit 158 is structured for sending and receiving data over a communication network (e.g., the network 110). Accordingly, the network interface circuit 158 includes any of a cellular transceiver (for cellular standards), wireless network transceiver (for 802.11X, ZigBee, Bluetooth, Wi-Fi, or the like), wired network interface, or a combination thereof. For example, the network interface circuit 158 may include wireless or wired network modems, ports, baseband processors, and associated software and firmware.

The TST generation circuit 160 is structured to receive, via the network interface circuit 158, a request for TST, where the request includes the hashed data generated by the requestor computing system 106. The TST generation circuit 160 can generate a TST. The TST generation circuit 160 can return the TST to the requestor and publish the TST in at least one blockchain in the manner described. ANSI X9.95 defines requirements and methodologies for a TSA to issue a TST. Unlike legacy timestamps which rely on synchronized clocks, TSA use calibrated clocks aligned with a National Measurement Institutes (NMI) and the International Time Authority (ITA). The Bureau International des Poids et Mesures (BIPM) near Paris, France is the official ITA that calibrates the clocks of each NMI. The two NMI in the USA is the NIST Time and Frequency Division that manages the FI Cesium Fountain Atomic Clock and the United States Naval Observatory (USNO) which manages the Global Positioning System (GPS).

While various circuits, interfaces, and logic with particular functionality are shown, it should be understood that each of the computing systems 102, 104, and 105 includes any number of circuits, interfaces, and logic for facilitating the operations described herein. For example, the activities of multiple circuits are combined as a single circuit and implemented on the same processing circuit (e.g., the processing circuit), as additional circuits with additional functionality are included.

Figure 2:
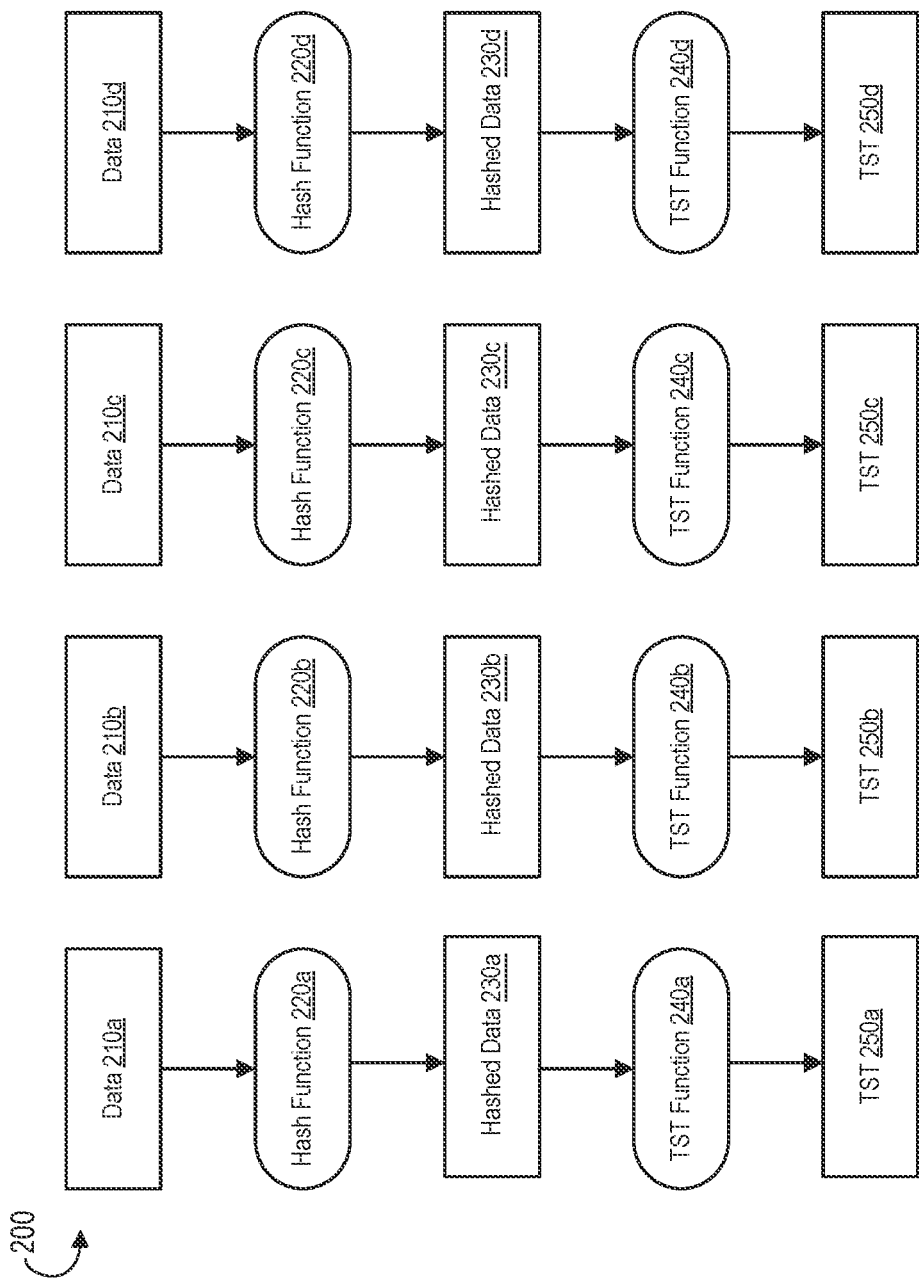
FIG. 2 is a diagram illustrating an example method for generating TSTs, according to some arrangements.

FIG. 2 is a diagram illustrating an example method 200 for generating TSTs 250a, 250b, 250c, and 250d, according to some arrangements. The method 200 can be performed by the system 100, including the requestor computing system 106 and the TSA computing system 105.

The application circuit 122 of the requestor computing system 106 can execute one or more applications that generate or manage the original data, including for example original data 210a, 210b, 210c, and 210d. Each of the original data 210a, 210b, 210c, and 210d can be referred to as a unit of data. The original data 210a, 210b, 210c, and 210d can be generated at the same or different times, can have the same or different sizes, can be generated by the same or different applications executed by the application circuit 122, can have the same or different intended uses, and so on. In some examples, the original data 210b is modified original data 210a (e.g., revision), the original data 210c is modified original data 210b, and so on. In some examples, the application circuit 122 can store the original data 210a, 210b, 210c, and 210d in a local memory device, such as the memory 116. In some examples, the application circuit 122 can store the original data 210a, 210b, 210c, and 210d in a third party system, such as a datacenter, a server, a network storage system, a Third Party Service Provider (TPSP), a Cloud Service Provider (CSP), and so on. The application circuit 122 can configure the network interface circuit 118 to send the original data 210a, 210b, 210c, and 210d and the TSTs 250a, 250b, 250c, and 250d to the third party system via the network 110 to be stored. In some examples, the application circuit 122 can store the original data 210a, 210b, 210c, and 210d in a blockchain hosted by the requestor computing system 106 or another system as described. In some examples, each of the original data 210a, 210b, 210c, and 210d can be identified or accessed using a link or address such as a URL of a location where each of the original data 210a, 210b, 210c, and 210d is stored, a URI of a location where each of the original data 210a, 210b, 210c, and 210d is stored, a URN of a location where each of the original data 210a, 210b, 210c, and 210d is stored, and so on.

The data integrity circuit 120 can run each of the original data 210a, 210b, 210c, and 210d through a hash function to generate corresponding hashed data. For example, the original data 210a can be run through the hash function 220a to generate hashed data 230a. The original data 210b can be run through the hash function 220b to generate hashed data 230b. The original data 210c can be run through the hash function 220c to generate hashed data 230c. The original data 210d can be run through the hash function 220d to generate hashed data 230d. Examples of each of hashing functions 220a, 220b, 220c, and 220d include SHA-256 and SHA-512. The data integrity circuit 120 can send the resulting hashed data 230a, 230b, 230c, and 230d to the TSA computing system 105 via the network 110. While the inputs to the hash functions 220a, 220b, 220c, and 220d are referred to as the original data 210a, 210b, 210c, and 210d, the inputs to the hash functions 220a, 220b, 220c, and 220d can include the unsigned original data, signed original data, encrypted original data, or signcrypted original data. Accordingly, each of the hashed data 230a, 230b, 230c, and 230d can be a hash of unsigned data, a hash of signed data, a hash of encrypted data, a hash of signcrypted data.

The TSA computing system 105 can generate the TSTs 250a, 250b, 250c and 250d by running the hashed data 230a, 230b, 230c, and 230d through TST functions 240a, 240b, 240c, and 240d (e.g., TST operation, process, and so on), respectively. The TSA computing system 105 does not have access to the original data 210a, 210b, 210c, and 210d. Each of the functions 240a, 240b, 240c, and 240d includes creating a TST by appending a timestamp from a calibrated clock to the respective hashed data 230a, 230b, 230c, and 230d and generating a cryptographic signature, such as a digital signature, a Message Authentication Code (MAC), an Hash-based Message Authentication Code (HMAC), or a hash chain over the timestamp appended to the respective one of the hashed data 230a, 230b, 230c, and 230d. The cryptographic signature can be verified by the relying party 104 to determine integrity provable to a trusted time indicated by the TST. In some examples, the TST can be generated using one or more TST mechanisms including 1) Digital Signature Method, 2) MAC Method, 3) Linked Token Method, 4) Linked and Signed Method, and 5) Transient Key Method. Linked Token Method uses a MAC for the TST cryptographic signature while the Linked and Signed Method uses a digital signature for the TST cryptographic signature. Both methods create a chain of TST linked together using a hash algorithm. The Transient Key Method uses Elliptic Curve Digital Signature Algorithm (ECDSA) to sign each TST and changes the signature key on a regular interval and manages the ECDSA signature keys using an internal key chain. In some arrangements, the TSTs 250a, 250b, 250c and 250d can be published to a blockchain. In some arrangements, each of the TSTs 250a, 250b, 250c and 250d can be a signed TST having the format [hash (data), timestamp, sign (hash (data), timestamp)].

Figure 3:
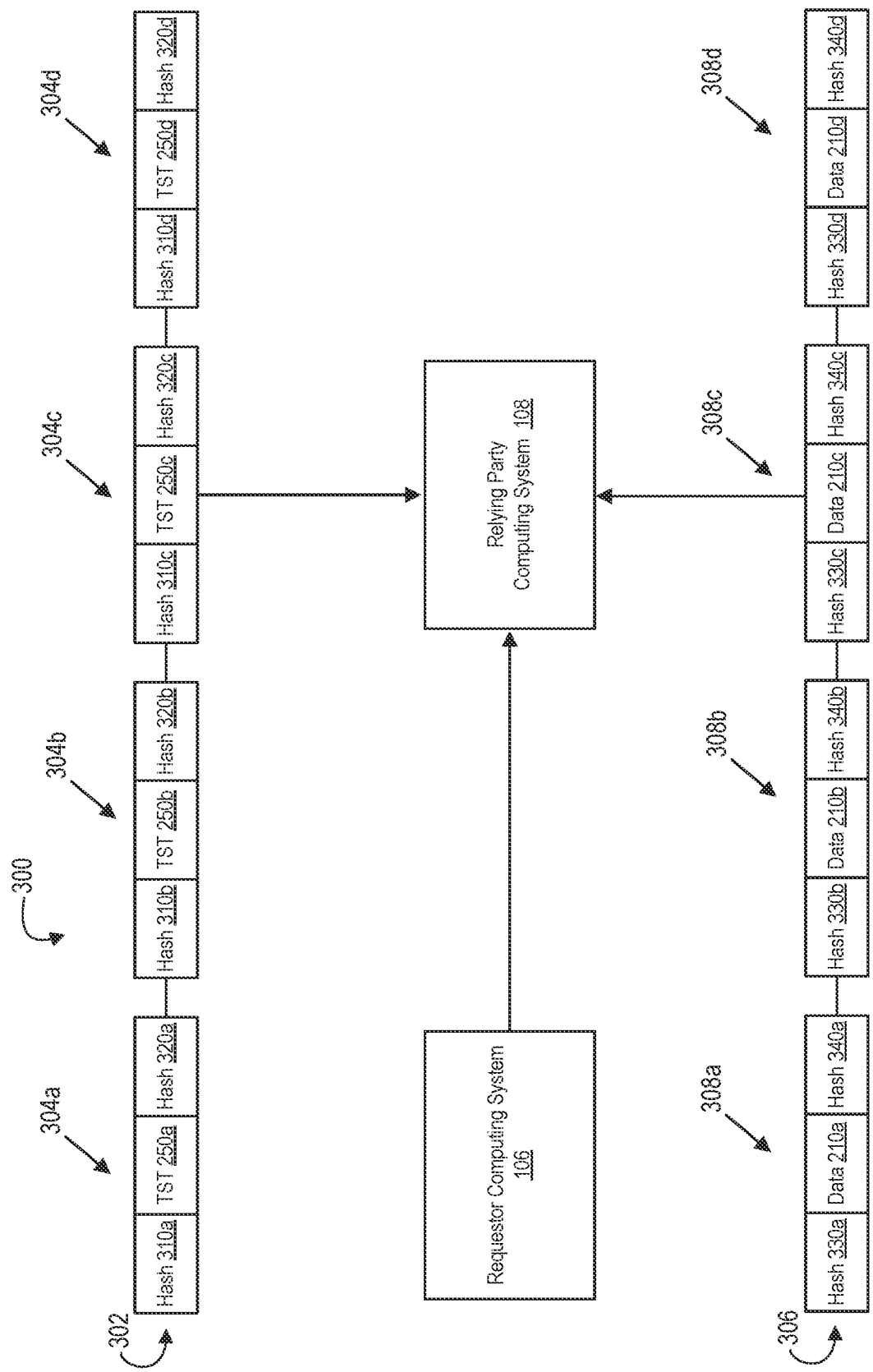
FIG. 3 is a diagram illustrating an example method for blockchain-based TST verification, according to some arrangements.

FIG. 3 is a diagram illustrating an example method 300 for blockchain-based TST verification, according to some arrangements. The method 300 can be performed by the system 100, including the requestor computing system 106, the relying party computing system 108, and the TSA computing system 105.

In some arrangements, the TST generation circuit 160 can publish the TSTs 250a, 250b, 250c and 250d to a blockchain 302. The blockchain 302 is a chain of data blocks (e.g., data blocks 304a, 304b, 304c, and 304d) linked together using a cryptographic hash. The block 304a is the first block of the blockchain 302. The block 304b is the next block following the block 304a. The block 304c is the next block following block 304b. The block 304d is the next block following block 304c, and so on. Each of blocks 304a, 304b, 304c, and 304d includes a link hash (e.g., a respective one of the hashes 310a, 310b, 310c, and 310d) and data element (e.g., a respective one of the TST 250a, 250b, 250c and 250d). A link hash is the hash of the previous block. Therefore, the hash 310b (e.g., hash (304a)) is the hash of the block 304a, the hash 310c (e.g., hash (304b)) is the hash of the block 304b, the hash 310d (e.g., hash (304c)) is the hash of the block 304c, and so on. The hash 310a is null as there is no block before the block 304a. In other words, the first block 304a cannot point to a previous block as there is no previous block to hash. Thus, the hash 310a is either a null or hash (null). Accordingly, the block 304a can be in the format of [null, TST 250a, hash 320a]. The blockchain is considered immutable as any data change in any block, except for the block 304d will negate one or more hashes 310b, 310c, or 310d. For example, a change in TST 250a will invalidate hash 310b and consequently hashes 310c, 310d, and so on.

In some examples, each of the blocks 304a, 304b, 304c, and 304d has, in addition to the link hashes 310a, 310b, 310c, and 310d, an internal data hash (e.g., hashes 320a, 320b, 320c, and 320d) for the data element of the same block. For example, each of the blocks 304a, 304b, 304c, and 304d contains a hash (e.g., a respective one of the hashes 320a, 320b, 320c, and 320d) of its own data element (e.g., a respective one of the TST 250a, 250b, 250c, and 250d), which is consequently the hash of each block. The hash 320a has a format of hash (TST 250a), the hash 320b has a format of hash (TST 250b), the hash 320c has a format of hash (TST 250c), and the hash 320d has a format of hash (TST 250d).

Thus, each of the link hashes 310b, 310c, and 310d is a hash of all three block elements (e.g., the link hash, the data element, and the data hash) of the previously block. The data hash allows verification of the data within a specific block without having to verify the entire blockchain. The immutability of the blockchain remains to be dependent on the link hash elements. In some arrangements, multiple TSA computing systems, each of which can be a system such as the TSA computing system 105, can post on the same blockchain in the manner described. That is, a first block (e.g., block 304b) of the blockchain 302 can include the TST (e.g., the TST 250b) published by a first TSA computing system and a second block (e.g., block 304c) of the blockchain 302 can include the TST (e.g., the TST 250c) published by a second TSA computing system.

The application circuit 122 executes one or more applications that generate or manage the original data 210a, 210b, 210c, and 210d, which published on a blockchain 306. The blockchain 306 is a chain of data blocks (e.g., data blocks 308a, 308b, 308c, and 308d) linked together using a cryptographic hash. The block 308a is the first block of the blockchain 306. The block 308b is the next block following the block 308a. The block 308c is the next block following block 308b. The block 308d is the next block following block 308c, and so on. Each of blocks 308a, 308b, 308c, and 308d includes a link hash (e.g., a respective one of the hashes 330a, 330b, 330c, and 330d) and data element (e.g., a respective one of the original data 210a, 210b, 210c, and 210d). In some examples, each subsequent block contains data that is the modified or updated version of the previous data to control various versions of the same file, document, or information. In some examples, each subsequent block contains a segment or a portion of a file, document, or software. A link hash is the hash of the previous block. Therefore, the hash 330b is the hash of the block 308a, the hash 330c is the hash of the block 308b, the hash 330d is the hash of the block 308c, and so on. The hash 330a is null as there is no block before the block 308a. In other words, the first block 308a cannot point to a previous block as there is no previous block to hash. Thus, the hash 330a is either a null or hash (null). Accordingly, the block 308a can be in the format of [null, data 210a, hash 340a]. The blockchain is considered immutable as any data change in any block, except for the block 308d will negate one or more hashes 330b, 330c, or 330d. For example, a change in data 210a will invalidate hash 330b and consequently hashes 330c, 330d, and so on.

In some examples, each of the blocks 308a, 308b, 308c, and 308d has, in addition to the link hashes 330a, 330b, 330c, and 330d, an internal data hash (e.g., hashes 340a, 340b, 340c, and 340d) for the data element of the same block. For example, each of the blocks 308a, 308b, 308c, and 308d contains a hash (e.g., a respective one of the hashes 340a, 340b, 340c, and 340d) of its own data element (e.g., a respective one of the original data 210a, 210b, 210c, and 210d), which is consequently the hash of each block. The hash 340a has a format of hash (data 210a), the hash 340b has a format of hash (data 210b), the hash 340c has a format of hash (data 210c), the hash 340d has a format of hash (data 210d). Thus, each of the link hashes 330b, 330c, and 330d is a hash of all three block elements (e.g., the link hash, the data element, and the data hash) of the previously block. The data hash allows verification of the data within a specific block without having to verify the entire blockchain. The immutability of the blockchain remains to be dependent on the link hash elements.

Figure 4:
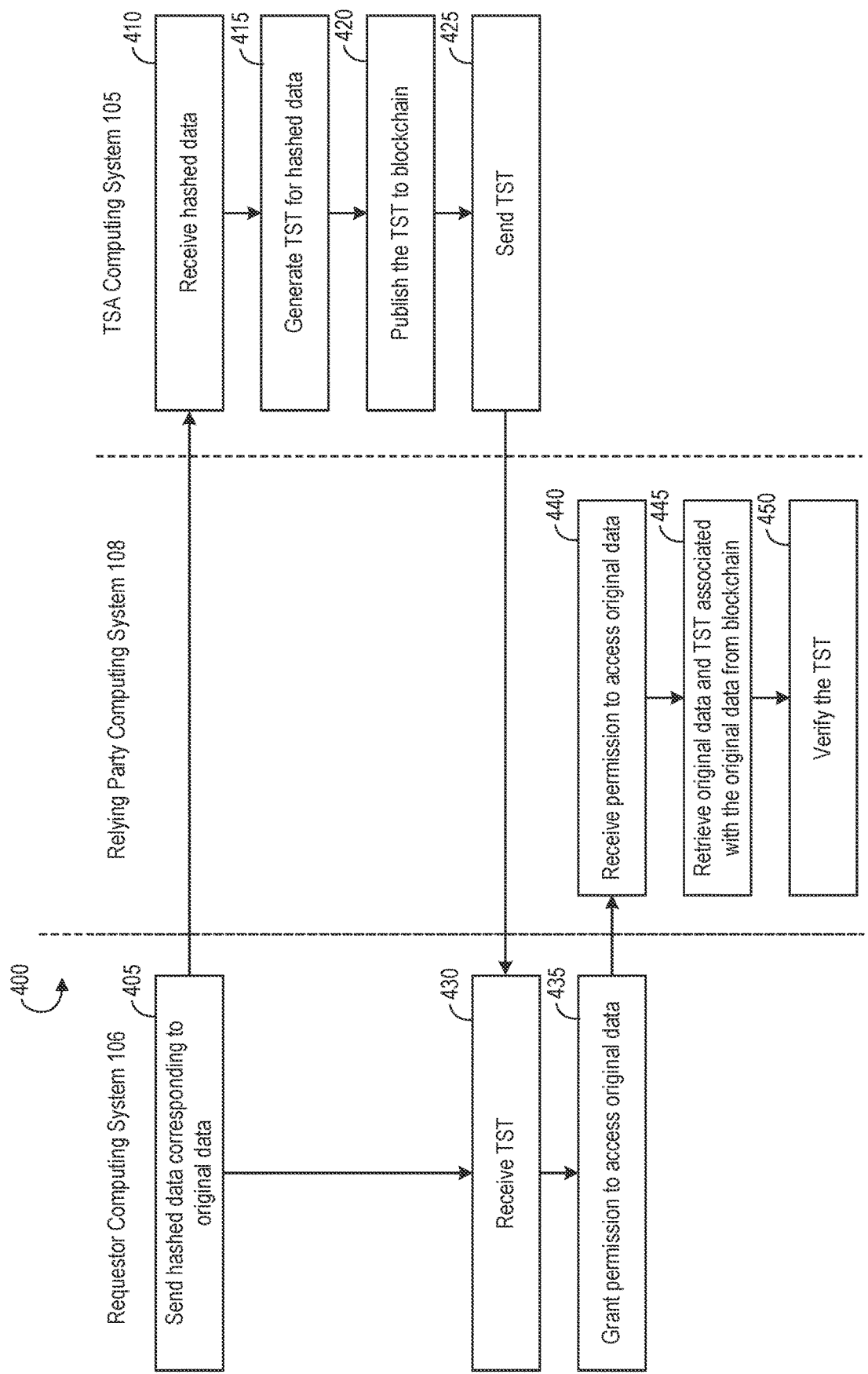
FIG. 4 is a diagram illustrating an example method for blockchain-based TST verification, according to some arrangements.

FIG. 4 is a diagram illustrating an example method 400 for blockchain-based TST verification, according to some arrangements. The method 400 can be performed by the system 100, including the requestor computing system 106, the relying party computing system 108, and the TSA computing system 105. The methods 200 and 300 are particular implementations of the method 400.

At 405, the requestor computing system 106 sends the hashed data (e.g., the hashed data 230*a*, 230*b*, 230*c*, and 230*d*) corresponding to the original data (e.g., the original data 210*a*, 210*b*, 210*c*, and 210*d*) to the TSA computing system 105. At 410, the TSA computing system 105 receives the hashed data. In other words, the requestor computing system 106 retains the original data (e.g., the original data 210*a*, 210*b*, 210*c*, and 210*d* and/or the blockchain 306) for example, by not revealing the addresses of the blocks 308*a*, 308*b*, 308*c*, and 308*d* to the TSA computing system 105 or by not sending the original data 210*a*, 210*b*, 210*c*, and 210*d* to the TSA computing system 105.

At 415, the TSA computing system 106 generates the TST (e.g., the TST 250*a*, 250*b*, 250*c*, and 250*d*) for the hashed data. For example, as described, the TSA computing system 105 can generate the TSTs 250*a*, 250*b*, 250*c* and 250*d* by running the hashed data 230*a*, 230*b*, 230*c*, and 230*d* through TST functions 240*a*, 240*b*, 240*c*, and 240*d*, respectively.

At 420, the TSA computing system 105 publishes the TST (e.g., the TSTs 250*a*, 250*b*, 250*c* and 250*d*) to a blockchain (e.g., the blockchain 302). As each TST or group of TSTs is generated, the TST or group of TSTs are added to the blockchain 302. The TSA computing system 105 can publish a TST to one or multiple blockchains specific to each requestor 102 or the requestor computing system 106, in some examples. TSTs generated for only the same requestor 102 or the same requestor computing system 106 can be published to a blockchain specific to each requestor 102 or the requestor computing system 106. In some examples, the TSA computing system 105 can publish a TST to one or multiple blockchains on which TSTs generated for multiple requestors 102 or multiple requestor computing systems 106 can be published. In some examples, TSA computing system 105 can publish a TST to at least one of: one or more public blockchains, one or more private blockchains, or one or more permissioned blockchains. In some examples, TSA computing system 105 can publish a TST to two or more of the same type of blockchains described herein or two or more different types of blockchains described herein.

For example, the hashed data includes first hashed data (e.g., the hashed data 230*b*) and second hashed data (e.g., the hashed data 230*c*). Generating the TST for the hashed data includes generating a first TST (e.g., the TST 250*b*) for the first hashed data and a second TST (e.g., the TST 250*c*) for the second hashed data. Sending the TST includes sending the first TST and the second TST. Publishing the TST to the blockchain includes publishing the first TST (e.g., the TST 250*b*) in a first block 304*b* of the blockchain 302, the first block 304*b* including the first TST, and publishing the second TST (e.g., the TST 250*c*) in a second block 304*c* of the blockchain 302, the second block 304*c* including the second TST.

At 425, the TSA computing system 105 sends the TST to the requestor computing system 106. In some examples, sending the TST includes sending a link, address, or identifier of the TST on the blockchain. For example, the link, address, or identifier of the TST on the blockchain can be a link, address, or identifier of a block on the blockchain that contains the TST. In some examples, sending the TST includes sending the link, address, or identifier of the TST on the blockchain and the actual TST. At 430, the requestor computing system 106 receives the TST (e.g., the link, address, or identifier of the TST on the blockchain, or alternatively, the link, address, or identifier of the TST on the blockchain and the actual TST) from the TSA computing system 105.

At 435, the requestor computing system 106 grants permission (e.g., sends a permission notification) to the relying party computing system 108 to access the original data (e.g., the original data 210*c*). At 440, the relying party computing system 108 receives the permission (e.g., receives the permission notification) from the requestor computing system 106. The permission or permission notification includes a link, address, or identifier of the TST (e.g. the TST 250*c*) on the blockchain 302. The link, address, or identifier of the TST includes a URL, a URI, a URN, or another suitable identifier that identifies the block on the blockchain that contains the TST associated with the original data. The permission or permission notification includes the original data, or a link or address of the original data. For example, the link or address of the original data includes a URL of a location where the original data is stored, a URI of a location where the original data is stored, a URN of a location where the original data is stored, and so on.

In some examples, the permission as a whole or the link, address, or identifier of the TST has a Time-To-Live (TTL) such as 5 seconds, 30 seconds, 1 minute, 5 minutes, 30 minutes, 1 hour, 1 day, 2 days, and so on. After expiration of the TTL, the relying party computing system 108 can request a new permission with a new TTL. After expiration of the TTL, a smart contract executing on the blockchain 302 or the TSA computing system 105 can deny access to the TST on the blockchain 302.

At 445, the relying party computing system 108 retrieves the original data (e.g., the data 210*c*) and the TST (e.g., the TST 250*c*) associated with the original data from the blockchain (e.g., the blockchain 302). For example, the data verification circuit 140 can receive the original data directly from the requestor computing system 106 or retrieve the original data using the received link or address of the original data. The data verification circuit 140 can retrieve the corresponding TST using the link, address, or identifier of the TST.

At 450, the relying party computing system 108 verifies the TST. The Relying Party verifies the TST which provides data integrity provable to a trusted time. For example, the relying party computing system 108 can verify the cryptographic signature (e.g., a digital signature, a MAC, a HMAC, or a hash chain) over the timestamp appended to the hashed data 230*c* to verify the TST. In some examples, given that the TST includes the hashed data which is a hash of the original data, the data verification circuit 140 can run the original data through the same hash function by which the hashed data is generated to generate hashed data. If the hashed data generated by the data verification circuit 140 is the same as the hashed data included in the TST, then TST is verified. In some examples, the data verification circuit 140 retrieve a calibration record from the TSA computing system 105 to determine whether at the time noted by the timestamp in the TST a calibration for the hashed data has occurred at the TSA 103. In response to verifying the TST, the application circuit 142 can use the original data. For example, the application circuit 142 can use the original data as input to generate an output. The application circuit 142 can store the original data in a local storage (e.g., the memory 136) or another suitable third party system, such as a datacenter, a server, a network storage system, a TPSP, a cloud provider. and so on. On the other hand, in response to failing to verify the TST, the data verification circuit 140 rejects the original data and send a rejection message to the requestor computing system 106 and/or the TSA computing system 105.

In some arrangements, the requestor 102 or the requestor computing system 106 can allow public access to the blockchain location of the associated TST for original data such as a white paper, product specification, data sheet, general information, Certificate Practice Statement (CPS), Certificate Policy (CP), tax authority document, and so on. That is, the blockchain 302 is on a public blockchain which allows any relying party or relying party computing system 108 access without prior permission. Accordingly, blocks 435 and 440 can be omitted.

Centralized software repositories for open source software have become increasing popular, although such centralized software repositories lack the benefits of code sign or other integrity and authentication controls. In some arrangements, the original data includes code signed software or code, and each block in the blockchain 306 can correspond to a different version of the signed software or code or a different portion of the signed software or code. For example, the requestor computing system 106 (e.g., the data integrity circuit 120) can code sign software or codes of the software to generate a signature. The original data which includes a combination of the software, the signature over the software, and a public key certificate of the requestor 102 corresponding to the signature is run through a hash function to generate the hashed data. The relying party computing system 108 can verify the TST at 450 in the manner described. The data verification circuit 140 of the relying party computing system 108 can further verify the software using the public key certificate of the requestor 102. The relying party computing system 108 can receive a link or address of the software and retrieve the software using the same. Upon verifying the TST and the software (using the public key certificate), the application circuit 142 can download and install the software. Given that the TST contains a hash of signed data provable to a trusted time via the TST, this scheme provides blockchain-based actual non-repudiation in the examples in which the requester computing system 106 sends a hash of signed data to the TSA computing system 105, where the TST is a hash of data (signed or unsigned) for interoperability.

Online application and software stores for licensed software have become increasing popular but lack the benefits of proprietary integrity and authentication controls. In some arrangements, the original data includes code signed licensed software, and each block in the blockchain 306 can correspond to a different version of the code signed licensed software or a different portion of the code signed licensed software. For example, the requestor computing system 106 (e.g., the data integrity circuit 120) can code sign software to be licensed or codes of the software to be licensed to generate a signature. The original data which includes a combination of the software to be licensed, the signature over the software, and a public key certificate of the requestor 102 corresponding to the signature is run through a hash function to generate the hashed data. The relying party computing system 108 can verify the TST at 450 in the manner described. The data verification circuit 140 of the relying party computing system 108 can further verify the software to be licensed using the public key certificate of the requestor 102. The relying party computing system 108 can receive a link or address of the software and retrieve the software to be licensed using the same. Upon verifying the TST and the software (using the public key certificate), the application circuit 142 can download and install the software. Given that the TST contains a hash of signed data provable to a trusted time via the TST, this scheme provides blockchain-based actual non-repudiation in the examples in which the requester computing system 106 sends a hash of signed data to the TSA computing system 105, where the TST is a hash of data (signed or unsigned) for interoperability.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

The invention claimed is:

1. A method, comprising:
receiving, by a Time Stamp Authority (TSA) computing system from a requestor computing system, hashed data corresponding to original data, wherein the hashed data comprises first hashed data and second hashed data;
generating, by the TSA, a Time Stamp Token (TST) for the hashed data, wherein generating the TST for the hashed data comprises generating a first TST for the first hashed data and a second TST for the second hashed data;
publishing, by the TSA, the TST to a blockchain, wherein publishing the TST to the blockchain comprises:
publishing the first TST in a first block of the blockchain, the first block comprising the first TST;
publishing the second TST in a second block of the blockchain, the second block comprising the second TST; and
sending, by the TSA to the requestor computing system, the TST, wherein sending the TST comprises sending the first TST and the second TST.

2. The method of claim 1, wherein the blockchain is specific to the requestor computing system or a requestor associated with the requestor computing system.

3. The method of claim 1, wherein the blockchain is a public blockchain.

4. The method of claim 1, wherein a relying party computing system retrieves the original data and the TST and verifies TST.

5. The method of claim 1, wherein the second block comprises a link hash that is a hash of the first block.

6. A method, comprising:
sending, by a requestor device to a Time Stamp Authority (TSA) computing system, hashed data corresponding to original data, wherein the TSA computing system publishes a Time Stamp Token (TST) for the hashed data to a blockchain, wherein the hashed data comprises first hashed data and second hashed data, and wherein the blockchain comprises:
a first block having a first TST for the first hashed data; and
a second block having a second TST for the second hashed data; and
granting, by the requestor computing system to a relying party computing system in response to a request by the relying party, permission to access the original data, wherein the relying party computing system retrieves the original data and the TST and verifies TST, wherein the original data is retrieved from the requestor device or via a link or address of the original data.

7. The method of claim 6, wherein granting the permission to access the original data comprises sending, by the requestor computing system to the relying party computing system, a link, address, or identifier of the TST on the blockchain.

8. The method of claim 6, wherein the permission has a Time-To-Live (TTL), and the link comprises a Uniform Resource Locator (URL) of the TST on the blockchain.

9. The method of claim 6, wherein the hashed data comprises at least one of a hash of unsigned data, a hash of signed data, a hash of encrypted data, a hash of data that has been signcrypted.

10. The method of claim 6, wherein the second block comprises a link hash that is a hash of the first block.

11. A method, comprising:
receiving, by a relying party computing system from a requestor computing system, permission to access original data;
retrieving, by the relying party computing system the original data and a Time Stamp Token (TST) generated by a Time Stamp Authority (TSA) for hashed data corresponding to the original data, the TST published to a blockchain, wherein the hashed data comprises first hashed data and second hashed data, and wherein the blockchain comprises:
a first block having a first TST for the first hashed data; and
a second block having a second TST for the second hashed data;
verifying, by the relying party computing system, the TST.

12. The method of claim 11, the blockchain is specific to the requestor computing system or a requestor associated with the requestor computing system.

13. The method of claim 11, wherein the blockchain is a public blockchain.

14. The method of claim 11, wherein receiving the permission to access the original data comprises receiving, by the relying party computing system from the requestor computing system, a link, address, or identifier of the TST on the blockchain.

15. The method of claim 14, wherein the permission has a Time-To-Live (TTL).

16. The method of claim 14, wherein the link comprises a Uniform Resource Locator (URL) of the of the TST on the blockchain.

17. The method of claim 11, wherein the second block comprises a link hash that is a hash of the first block.

* * * * *